THEODORE WYATT
INVENTOR

THEODORE WYATT
INVENTOR

Sept. 28, 1965          T. WYATT          3,209,357

HYPERBOLIC POSITION DETERMINATION

Filed Jan. 10, 1963          3 Sheets-Sheet 3

SEPARATION TIME
VS.
VELOCITY INCREMENT
AT
500 NAUTICAL MILE
CIRCULAR ORBIT

THEODORE WYATT
INVENTOR

BY Claude Funkhouser
ATTORNEY

United States Patent Office 3,209,357
Patented Sept. 28, 1965

3,209,357
HYPERBOLIC POSITION DETERMINATION
Theodore Wyatt, Silver Spring, Md., assignor to the United States of America as represented by the Secretary of the Navy
Filed Jan. 10, 1963, Ser. No. 250,993
4 Claims. (Cl. 343—112)

The present invention relates in general to reconnaissance and surveillance functions and more particularly to a method for performig either function by (1) the use of two or more earth satellites as passive signal receptors and (2) the determination of the position of the signal source by an analysis of the received signals employing methods similar to hyperbolic navigation.

By precise measurement of the orbit of a satellite, it is possible to compute its position at any given time with great accuracy. Furthermore, through the employment of the inverse of the usual process of hyperbolic navigation it is possible to determine the position with respect to a number of satellites of a signal source under simultaneous observation of the satellites. Hyperbolic navigation is commonly used to locate a point in two dimensions, such as latitude and longitude; however, if instead of the usual assumption of hyperbolic lines-of-position, the more exact mathematical solution is employed involving spherical hyperbolic surfaces-of-position and a statistically significant number of measurements is made, then position determination of significance to scientific or military needs can be obtained. Consequently, with the methods set forth one can measure the position of a signal source to an accuracy approaching that of satellite tracking and hyperbolic navigation, i.e., a few hundred feet. The limit of accuracy of the technique as satellite tracking improves is believed to be established by the bandwidth of the data recording and transmission system employed and is estimated to approach a value of tens of feet. The position finding method is applicable to a variety of types of radiation, such as electromagnetic, infrared, or particle radiation, so long as discrete pulse shapes or wave forms emanating from substantially a point source can be discerned above the background noise level for correlation of like signal reception at the two or more receiving points.

An illustration of the application of the invention in locating a radar station would involve the use of two or more satellites, each receiving radar signals over the same frequency band and either telemetering the occurrence of signal reception or storing the information, together with precision timing information (such as can be obtained from a satellite-borne stable oscillator), in an appropriate memory or recording system for subsequent read-out. As the satellites orbit, either one or both pass through a substantial angular bearing from the signal source during the time interval in which both of the satellites are within line-of-sight receiving range and mutually receive a common series of signals during this time interval. By identifying the difference in time of receipt of individual signals by each satellite a hyperbolic position determination of the radar site can be accomplished.

It is an object of the invention to provide a method of reconnaissance of electrical or other radiation based on multiple satellite observation.

It is another object of the invention to provide a method of determining positions by satellite observations which employs a combination of hyperbolic navigation, signal signature analysis and multiple satellites.

It is also an object of the invention to provide a plurality of earth satellites for carrying out the aforesaid method.

Other objects and many of the attendant advantages of the present invention will be readily appreciated as the same becomes better understood by reference to the following detailed description when considered in connection with the accompanying drawings, wherein.

Figure 1:
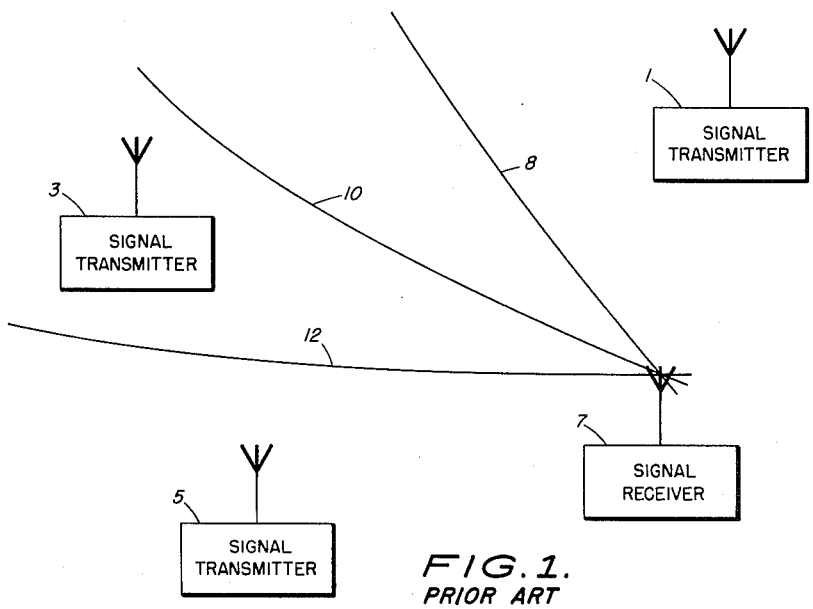
FIG. 1 is a schematic view illustrating a method of hyperbolic position finding using known transmitter sites.

The general principle of hyperbolic position finding employing three transmitters as pairs is shown in FIG. 1, wherein a plurality of transmitters are located at 1, 3 and 5. A receiver 7 can be located in any position in which signals from all the transmitters can be received.

Hyperbolic position finding, as normally performed, depends upon the reception of signals radiated from two or more sites at known locations and with known time synchronization of signal radiation. If the velocity of propagation is known with the desired precision of the position determination, the difference in time of arrival, corrected by the difference in time of signal initiation, defines a spherical hyperbolic surface on which the receiver must lie. Typically, the signal sources and the receiver's position are substantially at the surface of the earth and hence the line-of-position of interest is formed by the intersection of the hyperbolic surface and the spherical surface of the earth.

In FIG. 1, a line 8 represents the line-of-position obtained from the transmitters 1 and 3. Repetition of the process with transmitters 1 and 5 produces another line-of-position (l.o.p.) represented by a line 10. While a line 12 represents the line-of-position obtained from the transmitters 3 and 5. The geometric relationship between the receiver and the transmitters in practical cases results in a crossing of the l.o.p.'s, thereby defining the position of the receiver at the point of intersection. If either the signal sources or the receiver is at an altitude above the earth that is substantial as compared to the range between them, then the position with respect to the surface of the earth can be corrected by the projection of the slant ranges.

Figure 2:
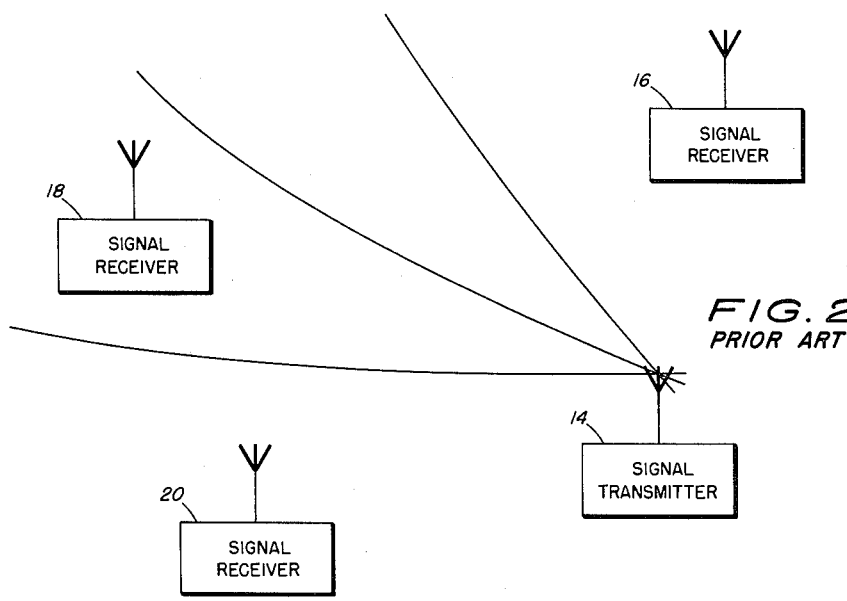
FIG. 2 is a schematic view illustrating a method of hyperbolic position finding using known receiver sites.

The inverse of the above process, determination of a single transmitter site with respect to three known receiver sites, is illustrated in FIG. 2, wherein a single transmitter is located at 14 and a plurality of receivers are located at 16, 18 and 20. Lines-of-position are again plotted and the transmitter 14 is located at the intersection of the plots.

Figure 3:
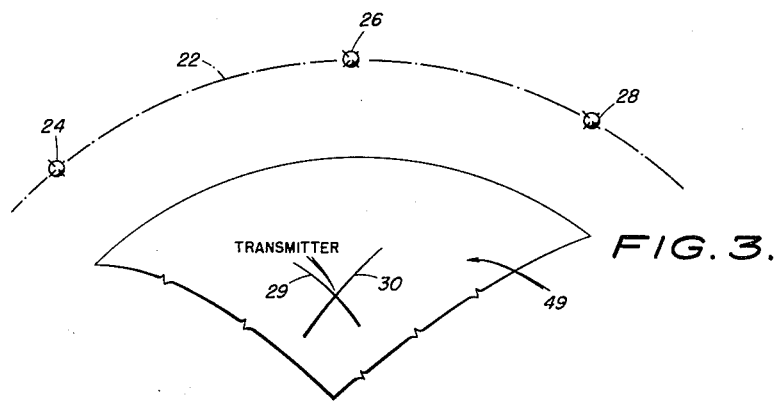
FIG. 3 is a schematic view illustrating a method of hyperbolic position finding using a single moving receiver.

In principle, a single receiver moved to several known locations can provide data permitting the determination of the position of a transmitter, granted a high degree of cooperation on the part of the transmitter. For example, if the signal is a pulsed transmission, an accurate knowledge of the time interval between initiation of each consecutive pulse during the entire time of observation, plus a count of the entire series of pulses and an assurance that there were no missing pulses for which allowance was not made, would permit a position determination, as illustrated in FIG. 3 in terms of establishing one of the required lines-of-position.

A satellite located in an orbit 22 moves consecutively through positions 24, 26 and 28. By counting the total number of pulses transmitted by the ground transmitter while moving from position 24 to 26, it is possible to determine the change in slant range from the satellite to the transmitter at point 26. This slant range defines a line-of-position 29 similar to those plotted previously in FIG. 1. Thereafter, the satellite continues counting the number of transmitted cycles while it moves from position 26 to position 28. The new total count permits a new change in slant range to be computed at position 28 which also assumes the form of a line-of-position 30. The intersection of these lines-of-position determines the location of the transmitter.

However, practical difficulties in employing this technique seem to make it of only academic interest for many applications; consequently, the invention is based on the use of multiple receivers. On the other hand, unless the phenomenon to be received can be expected to have only a single occurrence, two receivers at consecutive positions provide a series of lines-of-position for the various signals received. If the number of signals received from different similar sources is not so tremendous as to defy identification of occasional repetitive signals from the same individual source by the recognizable characteristics of the source, then two receivers instead of the minimum of three otherwise required is a desirable economy. However, if the phenomenon received has only a single occurrence, a minimum of three receivers is required.

As has been stated, the navigation system proposed is most advantageous when based on the utilization of pulsed signals having a pulse repetition frequency sufficiently low that there is no ambiguity in the identity of the pulses received at the two receivers constituting a pair. However, if there is an ambiguity as to pulse identification or if the signal is a continuous wave without a modulation affording the equivalent to pulse identification, a series of assumptions can be made regarding the pulse of CW correlation. Each assumption results in the construction of one of a family of hyperbolas. Since there is typically an opportunity to make observations at a number of points during the time interval of a satellite passage, a number of such families can be constructed and the true correlation and the true position corresponds to the majority of the total intersections.

Figure 4:
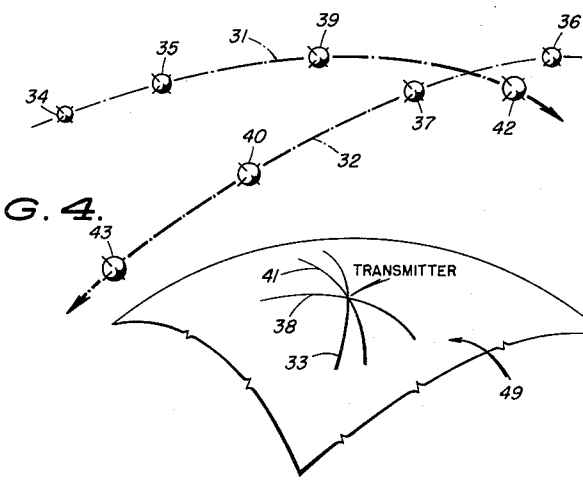
FIG. 4 is a schematic view illustrating a method of hyperbolic position finding using satellites in fortuitous passage.

The geometrical situation illustrated in FIG. 4 can occasionally be accomplished by a pair of satellites, each of which carries a receiver and is in an independent orbit.

One of said satellites is in an orbit 31, and the other is in an orbit 32. Each satellite counts the total number of cycles received from the unknown transmitter during discrete time intervals as the satellite passes overhead. Subsequently, a locus of position can be plotted from the information recorded by the pair of satellites. A l.o.p. 33 is plotted from the recorded information relayed by the satellite in the orbit 31 as it moves from position 34 to 35 and from the information relayed by the satellite in the orbit 32 as it moves from position 36 to 37. A second l.o.p. 38 is plotted from the combined recorded information from the satellites as they advance to their respective positions 39 and 40. An additional l.o.p. 41 is plotted from the combined recorded information as the satellites continue to advance to their next positions, respectively 42 and 43.

Figure 5:
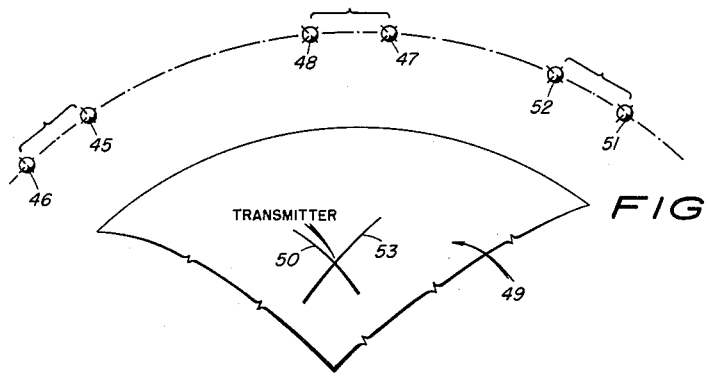
FIG. 5 is a schematic view illustrating a method hyperbolic position finding according to the invention.

However, this felicitous proximity of two satellites will occur only rarely, due to the difficulty of controlling the time phasing of satellites in separate orbits, and will provide a useful operating area for the pair which is limited in extent and is fixed in the latitude at which it can occur. These difficulties can be largely eliminated, and the signal correlation problem can be simplified as well (due to the more readily predictable nature of the signal reception received mutually by both), if the pair of satellites consist of two orbiting substantially in formation with each other as shown in FIG. 5, wherein a pair of satellites are shown in a plurality of different positions. The pair of satellites are first shown in positions 45 and 46. As the satellites move to their new respective positions 47 and 48, they record the signal emisisons for a transmitter located on the earth 49. From the information recorded as the satellites move to their new positions 47 and 48 it is possible, using the hyperbolic positioning technique, to draw l.o.p. 50. Continuing on to their third positions, respectively 51 and 52, the satellites record sufficient information to plot an additional l.o.p. 53, and the unknown transmitter is located at the intersection of the loci of positions 50 and 53.

At the present state of development, it is rather unlikely that satellites could be put into orbit by separate launching vehicles with sufficient precision to offer any reasonable probability that the orbits accomplished would have the same characteristics. However, the Transit Satellite Program has demonstrated the ease with which pick-a-back or multiple satellite launchings can be performed. This type of launching assures that both satellites are indeed in identical orbits, differing only by the small extent caused by the finite separation rate of the two resulting from the disconnection process. In the case of Transit and Breb satellites this separation has been caused by a relative velocity difference of about one foot per second, as the result of the thrust of a small spring acting between the two.

Figure 6:
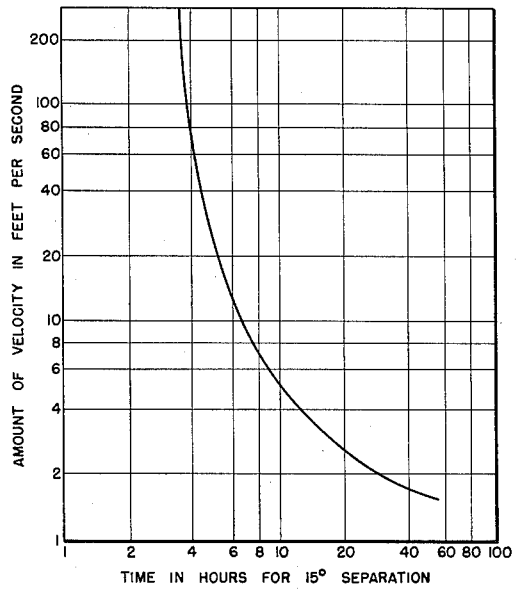
FIG. 6 is a graphical representation of the relationship of separation time to velocity increment of pick-a-back satellites.

Research on multiple satellite launching indicates that a desired separation in the phasing of two satellites, initially put into orbit by a single vehicle, can be accomplished by a very modest impulse applied to one of the two and that this separation can then be maintained within close limits by applying an impulse the same in magnitude but exactly opposite in direction to the first. The amount of impulse required is surprisingly small; for example, the separation of a satellite weighing 150 pounds from its mate by 1000 miles in two days and the arresting of the separation rate so as to maintain the separation requires about 15-pound-seconds of impulse. The relationship of separation time to velocity increment is set forth in FIG. 6.

Proper orientation of the satellite with respect to the orbital path at the instant of velocity additions or subtractions is necessary of course. One method which is satisfactory is the magnetic orientation technique as described by Fischell et al. in their U.S. patent application entitled "Magnetic Attitute Control," Serial No. 99,644, filed March 30, 1961, now Patent No. 3,118,637. So long as orbits are being conisdered as having an inclination of 67 degrees or more, the orbital plane twice daliy includes the north or south magnetic poles. This alignment thus provides a wide range of yaw control. In addition, due to the variation in the relative magnitude of the horizontal and vertical components of the magnetic field as a function of magnetic latitude, it is possible to select any desired pitch orientation, ranging from vertical to horizontal, by specifying a magnetic latitude, consequently, by the selection of a particular time within a particular orbital revolution nearly any orientation desired for propulsion can be attained.

Figure 7:
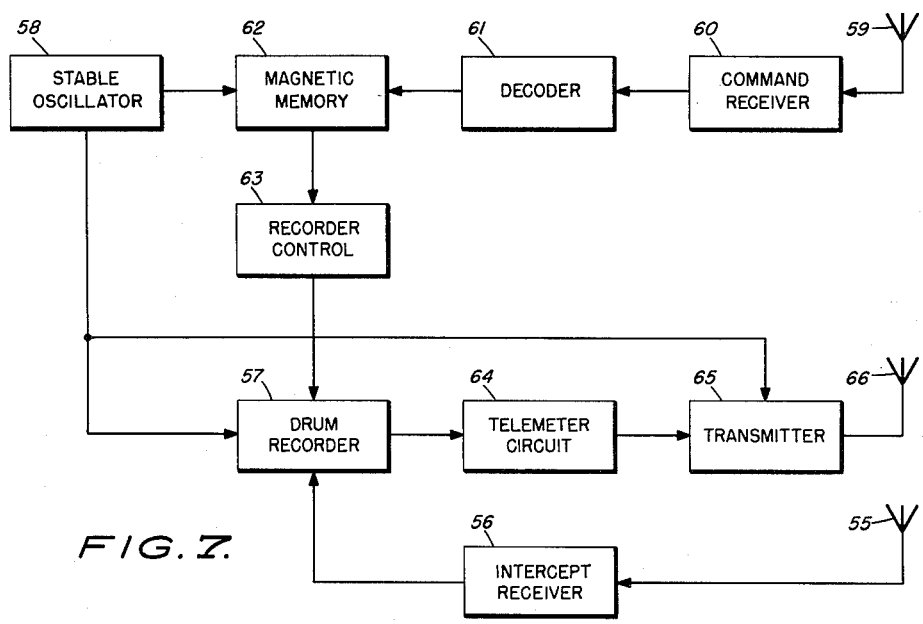
FIG. 7 is a block diagram of the electronic system for determining position according to the invention.

Referring to FIG. 7, there can be seen a block diagram of the satellite used to practice the instant invention.

The signals from the unknown transmitter are received by an antenna 55 which applies them to an intercept receiver 56. The intercept receiver 56 provides an input signal to a drum recorder 57, while a stable oscillator 58 provides a second input to the recorder.

An antenna 59 picks up the signals transmitted from an earthbound station, directing when the recording system is to be activated, assuming that the capacity of the recorder is not sufficient to allow the recorder to continuously operate. The antenna 59 applies the signal to a command receiver 60 which separates the information signal from its carrier signal. A decoder 61 takes the information signal and changes it into a form suitable for storing in a magnetic memory 62. The magnetic memory 62 stores data and reads out data under the control of timing signals from the oscillator 58.

The magnetic memory initiates the operation of a recorder control circuit 63 thereby turning on the recorder 57. During the period of operation of the recorder 57 all the signals picked up by the antenna 55 are stored. Once the recorder has been filled, the control circuit turns off the recorder until it is time to relay the intercepted signals to an earthbound station. At that time, the magnetic memory again activates the recorder control circuit 63, turning the recorder 57 into its playback mode. A telemeter circuit 64 suitably modulates the recorded signals for transmission by a transmitter 65 and an antenna 66.

Obviously, many modifications and variations of the present invention are possible in the light of the above teachings. It is therefore to be understood that within the scope of the appended claims the invention may be practiced otherwise than as specifically described.

What is claimed is:

1. A method of hyperbolic reconnaissance comprising,
   establishing in a known orbit a pair of artificial earth satellites,
   providing a stable oscillator aboard each of said pair of artificial earth satellites for generating a timing signal therewithin,
   receiving electromagnetic emissions from the earth in each of said satellites,
   recording said emissions within each of said satellites and the time derived from said stable oscillator at which they are received by said satellite,
   transmitting the recorded information from each of said satellites, and
   computing the position of said emissions from said transmitted information by the inverse hyperbolic position determination method.

2. A method of hyperbolic reconnaissance comprising,
   establishing in a known orbit a pair of artificial earth satellites,
   providing a stable oscillator aboard each of said pair of artificial earth satellites for generating a timing signal therewithin,
   providing a magnetic memory aboard each of said pair of artificial earth satellites,
   injecting operating instructions into said memory,
   receiving electromagnetic emissions from earth in each of said satellites,
   recording said emissions within each of said satellites and the time derived from said stable oscillator, at which they are received by said satellite according to said operating instructions,
   transmitting the recorded information from each of said satellites, and
   computing the position of said source of emissions from said transmitted information by the inverse hyperbolic position determination method.

3. A method of hyperbolic reconnaissance comprising,
   establishing in the same orbit a pair of artificial earth satellites,
   providing an oscillator aboard each of said pair of artificial earth satellites for generating a timing signal therewithin,
   separating the satellites while maintaining the same orbit,
   receiving electromagnetic emissions from the earth in each of said satellites,
   recording said emissions within each of said satellites and the time derived from said oscillator, at which they are received by said satellite,
   transmitting the recorded information from each of said satellites, and
   computing the position of said emissions from said transmitted information by the inverse hyperbolic position determination method.

4. A method of hyperbolic reconnaissance comprising,
   establishing in the same orbit a pair of artificial earth satellites,
   providing an oscillator aboard each of said pair of artificial earth satellites for generating a timing signal therewithin,
   providing a magnetic memory aboard each of said pair of artificial earth satellites,
   separating the satellites while maintaining the same orbit,
   injecting operating instructions into said memory,
   receiving electromagnetic emissions from the same earthbound source in each of said satellites,
   recording said emissions within each of said satellites and the time derived from said oscillator at which they are received by said satellite according to said operating instructions,
   transmitting the recorded information from each of said satellites, and
   computing the position of said source of emissions from said transmitted information by the inverse hyperbolic position determination method.

References Cited by the Examiner

UNITED STATES PATENTS 3,063,048   11/62   Lehan et al.

OTHER REFERENCES

"Navigation" (Journal of the Institute of Navigation), vol. 7, No. 4, Winter 1960–61, page 208.

I.R.E. National Convention Record, vol. 7, part 5, 1959, pages 228–230, 238.

CHESTER L. JUSTUS, *Primary Examiner.*